United States Patent
Xiong et al.

(10) Patent No.: US 10,348,597 B2
(45) Date of Patent: Jul. 9, 2019

(54) MONITORING SERVER, RESOLUTION SERVER, REQUEST DEVICE, AND NODE SELECTION METHOD

(71) Applicant: HUAWEI TECHNOLOGIES CO., LTD., Shenzhen (CN)

(72) Inventors: Chunshan Xiong, Beijing (CN); Anni Wei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 15/280,034

(22) Filed: Sep. 29, 2016

(65) Prior Publication Data
US 2017/0019322 A1    Jan. 19, 2017

Related U.S. Application Data

(63) Continuation of application No. PCT/CN2014/074802, filed on Apr. 4, 2014.

(51) Int. Cl.
*H04L 12/26* (2006.01)
*H04L 29/08* (2006.01)

(52) U.S. Cl.
CPC .......... *H04L 43/0894* (2013.01); *H04L 67/06* (2013.01); *H04L 67/1002* (2013.01); *H04L 67/32* (2013.01)

(58) Field of Classification Search
CPC . H04L 43/0894; H04L 67/06; H04L 67/1002; H04L 67/32
See application file for complete search history.

(56) References Cited

U.S. PATENT DOCUMENTS

| 7,882,139 B2 * | 2/2011 | Zou | G06F 17/30097 382/115 |
| 2003/0204602 A1 * | 10/2003 | Hudson | D01D 5/423 709/228 |

(Continued)

FOREIGN PATENT DOCUMENTS

| CN | 102355448 | 2/2012 |
| CN | 103023928 | 4/2013 |

(Continued)

OTHER PUBLICATIONS

International Search Report, dated Jan. 14, 2015, in International Application No. PCT/CN2014/074802 (4 pp.).

(Continued)

*Primary Examiner* — John M MacIlwinen
(74) *Attorney, Agent, or Firm* — Staas & Halsey LLP

(57) ABSTRACT

Embodiments of the present application provide a monitoring server, a resolution server, a request device, and a node selection method. The monitoring server in the present application includes a receiver, a processor, and a transmitter. The receiver is configured to receive a selection request message sent by the resolution server; the processor is configured to generate a first source node suggestion table according to the selection request message and a source node selection table; and the transmitter is configured to send the first source node suggestion table to the resolution server, so that the resolution server generates a second source node suggestion table according to the first source node suggestion table and sends the second source node suggestion table to the request device, and the request device selects a source node according to the second source node suggestion table.

17 Claims, 4 Drawing Sheets

(56) References Cited

U.S. PATENT DOCUMENTS

2008/0049701 A1* 2/2008 Bellford ............... H04M 3/487
370/342
2011/0106972 A1* 5/2011 Grube .................... H04L 67/06
709/238
2012/0158973 A1* 6/2012 Jacobson .......... H04L 29/12613
709/227
2013/0166695 A1 6/2013 Lee

FOREIGN PATENT DOCUMENTS

CN         103326882 A    9/2013
WO     2012/167106 A1    12/2012

OTHER PUBLICATIONS

Written Opinion of the International Searching Authority, dated Jan. 14, 2015, in International Application No. PCT/CN2014/074802 (9 pp.).
Chinese Office Action dated Jan. 19, 2018 in corresponding Chinese Patent Application No. 201480000608.2, 14 pgs.
International Search Report dated Jan. 14, 2015 in corresponding International Application No. PCT/CN2014/074802.

* cited by examiner

MONITORING SERVER, RESOLUTION SERVER, REQUEST DEVICE, AND NODE SELECTION METHOD

CROSS-REFERENCE TO RELATED APPLICATIONS

This application is a continuation of International Application No. PCT/CN2014/074802, filed on Apr. 4, 2014, the disclosure of which is hereby incorporated by reference in its entirety.

TECHNICAL FIELD

Embodiments of the present application relate to the communications technologies, and in particular, to a monitoring server, a resolution server, a request device, and a node selection method.

BACKGROUND

Information-Centric Networking (ICN) changes content and terminal locations in a current end-to-end communication mechanism of the Internet to be no longer correlated, and provides services such as storage and multi-party communication by using a publish/subscribe paradigm (Publish/Subscribe Paradigm). The ICN has a structure extremely similar to that of a Transmission Control Protocol (TCP)/Internet Protocol (IP) network, where both structures are of a sandglass model, and a difference only lies in that, in the structure of the ICN, an IP is replaced with a content chunk.

Currently, many methods or engineering application projects are springing up in terms of study on the ICN, which can be mainly divided into two major branches: the European branch and the US branch. In Europe, there are mainly a Publish-Subscribe Internet Technology (PURSUIT), a Publish-Subscribe Internet Routing Paradigm (PSIRP), a Network of Information (NetInf), Scalable and Adaptive Internet Solutions (SAIL), and Content-Oriented Networking: a New Experience for Content Transfer (CONNECT). In the United States, there are mainly Content Centric Networking/Named Data Networking (CCN/NDN) and a Data Oriented Network Architecture (DONA).

In these existing ICN technologies, when wanting to receive a required information object (IO), a subscriber sends an IO request to a resolution server (RS) by using a client. After receiving the IO request, the RS generates a list having identifier information of at least one data source node according to location information, status information, load information, and the like of a reference node, and feeds back the list to the Client. After receiving the information list, the Client selects one node according to identifier information of the data source nodes and requests specific content of the IO.

In the prior art, reference information, which is fed back by the RS, of an identifier of a data source node is extremely limited. However, some services such as a video service have a relatively high bandwidth requirement. A data transmission rate between a requester and a source node directly affects service experience of a user. Therefore, in the ICN network, a data source node that is selected according to the reference information such as location information, status information, and load information for a service request having a relatively high bandwidth requirement may be not a most suitable node. Consequently, a video "freeze" phenomenon occurs due to a relatively low transmission rate between a requester and the selected source node.

SUMMARY

Embodiments of the present application provide a monitoring server, a resolution server, a request device, and a node selection method, to resolve a problem in the prior art that a "freeze" phenomenon may occur in a service having a relatively high bandwidth requirement.

According to a first aspect, an embodiment of the present application provides a monitoring server, including:

a receiver, a processor, and a transmitter, where the receiver, the processor, and the transmitter are sequentially connected, and the receiver and the transmitter are connected to a resolution server;

the receiver is configured to receive a selection request message sent by the resolution server, where the selection request information includes an access network identifier of a request device;

the processor is configured to generate a first source node suggestion table according to the selection request message and a source node selection table, where the source node selection table includes a transmission rate between the request device and at least one source node, and the first source node suggestion table includes an identifier of the at least one source node; and the transmitter is configured to send the first source node suggestion table to the resolution server, so that the resolution server generates a second source node suggestion table according to the first source node suggestion table and reference information of the at least one source node and sends the second source node suggestion table to the request device, and the request device selects a source node according to the second source node suggestion table, where the reference information includes location information, status information, and load information, and a quantity of identifiers of source nodes in the second source node suggestion table is less than or equal to a quantity of identifiers of source nodes in the first source node suggestion table.

According to the first aspect, in a first possible implementation manner of the first aspect, the access network identifier of the request device is obtained by the resolution server according to a received file request message sent by the request device.

According to the first possible implementation manner of the first aspect, in a second possible implementation manner, the selection request message further includes a source node identifier table, and the source node identifier table is a source node identifier table that is generated after the resolution server performs querying according to an identifier of a requested file and that has the requested file, where the identifier of the requested file is obtained by the resolution server according to the file request message.

According to any one of the first aspect, or the first or the second possible implementation manner of the first aspect, in a third possible implementation manner, the processor is further configured to query, according to the access network identifier of the request device, the source node selection table for a transmission rate between the access network identifier of the request device and each source node, and generate the first source node suggestion table according to the transmission rate between the access network identifier of the request device and each source node.

According to the third possible implementation manner of the first aspect, in a fourth possible implementation manner, the processor is further configured to query, according to the access network identifier of the request device and by means of longest prefix match, the source node selection table for the transmission rate between the access network identifier of the request device and each source node.

According to any one of the first aspect, or the first to the fourth possible implementation manners of the first aspect, in a fifth possible implementation manner, the receiver is further connected to the request device and the selected source node;

the receiver is further configured to receive a transmission rate that is between the request device and the selected source node and that is reported by the request device or the selected source node; and the processor is further configured to update the source node selection table according to the transmission rate between the request device and the selected source node.

According to the fifth possible implementation manner of the first aspect, in a sixth possible implementation manner, the receiver is further configured to receive the transmission rate that is between the request device and the selected source node and that is reported by the request device or the selected source node according to a preset time or a preset period.

According to a second aspect, an embodiment of the present application provides a resolution server, including: a transmitter, a receiver, and a processor, where the receiver and the processor are connected to the transmitter; the transmitter and the receiver are separately connected to a monitoring server; and the transmitter is further connected to a request device;

the transmitter is configured to send a selection request message to the monitoring server, so that the monitoring server generates a first source node suggestion table according to the selection request message and a source node selection table, where the selection request message includes an access network identifier of the request device, the source node selection table includes a transmission rate between the request device and at least one source node, and the first source node suggestion table includes an identifier of the at least one source node;

the receiver is configured to receive the first source node suggestion table sent by the monitoring server;

the processor is configured to generate a second source node suggestion table according to the first source node suggestion table and reference information of the at least one source node, where the reference information includes location information, status information, and load information, and a quantity of identifiers of source nodes in the second source node suggestion table is less than or equal to a quantity of identifiers of source nodes in the first source node suggestion table; and the transmitter is further configured to send the second source node suggestion table to the request device, so that the request device selects a source node according to the second source node suggestion table.

According to the second aspect, in a first possible implementation manner of the second aspect, the receiver is further connected to the request device; and the receiver is further configured to: before the transmitter sends the selection request message to the monitoring server, receive a file request message sent by the request device, where the file request message includes an identifier of a requested file and the access network identifier of the request device.

According to the first possible implementation manner of the second aspect, in a second possible implementation manner, the processor is further configured to: before the transmitter sends the selection request message to the monitoring server, perform querying according to the identifier of the requested file and generate a source node identifier table having the requested file, where correspondingly, the selection request message further includes the source node identifier table.

According to any one of the second aspect, or the first or the second possible implementation manner of the second aspect, in a third possible implementation manner, the transmitter is further configured to send the second source node suggestion table to the request device by using metadata.

According to a third aspect, an embodiment of the present application further provides a request device, including a receiver, a processor, and a transmitter, where the receiver is connected to the processor, and the receiver is further connected to a resolution server;

the receiver is configured to receive a second source node suggestion table sent by the resolution server, where the second source node suggestion table is generated by the resolution server according to a first source node suggestion table and reference information of at least one source node; the reference information includes location information, status information, and load information; the first source node suggestion table is generated by the monitoring server according to a selection request message that is sent by the resolution server and a source node selection table; the selection request message includes an access network identifier of the request device; the source node selection table includes a transmission rate between the request device and the at least one source node; the first source node suggestion table includes an identifier of the at least one source node; and a quantity of identifiers of source nodes in the second source node suggestion table is less than or equal to a quantity of identifiers of source nodes in the first source node suggestion table; and the processor is configured to select a source node according to the second source node suggestion table.

According to the third aspect, in a first possible implementation manner of the third aspect, the transmitter is configured to send a file request message to the resolution server before the receiver receives the source node suggestion table sent by the resolution server, where the file request message includes an identifier of a requested file and the access network identifier of the request device.

According to the third aspect or the first possible implementation manner of the third aspect, in a second possible implementation manner, the receiver is further configured to receive the second source node suggestion table that is sent by the resolution server by using metadata.

According to any one of the third aspect, or the first or the second possible implementation manner of the third aspect, in a third possible implementation manner, the processor is further configured to: if the second source node suggestion table includes identifiers of at least two source nodes, select one source node from the source node suggestion table according to priorities of the at least two source nodes, and request the requested file from the source node; or separately request, from the at least two source nodes, content fragments of the requested file according to priorities of the at least two source nodes, to obtain the requested file.

According to any one of the third aspect, or the first to the third possible implementation manners of the third aspect, in a fourth possible implementation manner, the transmitter is further connected to the monitoring server; and the transmitter is further configured to report a transmission rate between the request device and the selected source node to the monitoring server, so that the monitoring server updates the source node selection table.

According to the fourth possible implementation manner of the third aspect, in a fifth possible implementation manner, the transmitter is further configured to report the transmission rate between the request device and the selected source node to the monitoring server according to a preset time or a preset period, so that the monitoring server updates the source node selection table.

According to a fourth aspect, an embodiment of the present application further provides a node selection method, including:

receiving a selection request message sent by a resolution server, where the selection request includes an access network identifier of a request device;

generating a first source node suggestion table according to the selection request message and a source node selection table, where the source node selection table includes a transmission rate between the request device and at least one source node, and the first source node suggestion table includes an identifier of the at least one source node; and sending the first source node suggestion table to the resolution server, so that the resolution server generates a second source node suggestion table according to the first source node suggestion table and reference information of the at least one source node and sends the second source node suggestion table to the request device, and the request device selects a source node according to the second source node suggestion table, where the reference information includes location information, status information, and load information, and a quantity of identifiers of source nodes in the second source node suggestion table is less than or equal to a quantity of identifiers of source nodes in the first source node suggestion table.

According to the fourth aspect, in a first possible implementation manner of the fourth aspect, the access network identifier of the request device is obtained by the resolution server according to a received file request message sent by the request device.

According to the first possible implementation manner of the fourth aspect, in a second possible implementation manner, the selection request message further includes a source node identifier table, and the source node identifier table is a source node identifier table that is generated after the resolution server performs querying according to an identifier of a requested file and that has the requested file, where the identifier of the requested file is obtained by the resolution server according to the file request message.

According to any one of the fourth aspect, or the first or the second possible implementation manner of the fourth aspect, in a third possible implementation manner, the generating a first source node suggestion table according to the selection request message and a source node selection table includes:

querying, according to the access network identifier of the request device, the source node selection table for a transmission rate between the access network identifier of the request device and each source node; and generating the first source node suggestion table according to the transmission rate between the access network identifier of the request device and each source node.

According to the third possible implementation manner of the fourth aspect, in a fourth possible implementation manner, the querying, according to the access network identifier of the request device, the source node selection table for a transmission rate between the access network identifier of the request device and each source node includes:

querying, according to the access network identifier of the request device and by means of longest prefix match, the source node selection table for the transmission rate between the access network identifier of the request device and each source node.

According to any one of the fourth aspect, or the first to the fourth possible implementation manners of the fourth aspect, in a fifth possible implementation manner, the method further includes:

receiving a transmission rate that is between the request device and the selected source node and that is reported by the request device or the selected source node, and updating the source node selection table.

According to the fifth possible implementation manner of the fourth aspect, in a sixth possible implementation manner, the receiving a transmission rate that is between the request device and the selected source node and that is reported by the request device or the selected source node, and updating the source node selection table includes:

receiving the transmission rate that is between the request device and the selected source node and that is reported by the request device or the selected source node according to a preset time or a preset period, and updating the source node selection table.

According to a fifth aspect, an embodiment of the present application further provides a node selection method, including:

sending a selection request message to a monitoring server, so that the monitoring server generates a first source node suggestion table according to the selection request message and a source node selection table, where the selection request includes an access network identifier of a request device, the source node selection table includes a transmission rate between the request device and at least one source node, and the first source node suggestion table includes an identifier of the at least one source node;

receiving the first source node suggestion table sent by the monitoring server;

generating a second source node suggestion table according to the first source node suggestion table and reference information of the at least one source node, where the reference information includes location information, status information, and load information, and a quantity of identifiers of source nodes in the second source node suggestion table is less than or equal to a quantity of identifiers of source nodes in the first source node suggestion table; and sending the second source node suggestion table to the request device, so that the request device selects a source node according to the second source node suggestion table.

According to the fifth aspect, in a first possible implementation manner of the fifth aspect, before the sending a selection request message to a monitoring server, the method further includes:

receiving a file request message sent by the request device, where the file request message includes an identifier of a requested file and the access network identifier of the request device.

According to the first possible implementation manner of the fifth aspect, in a second possible implementation manner, before the sending a selection request message to a monitoring server, the method further includes:

performing querying according to the identifier of the requested file and generating a source node identifier table having the requested file, where correspondingly, the selection request message further includes the source node identifier table.

According to any one of the fifth aspect, or the first or the second possible implementation manner of the fifth aspect, in a third possible implementation manner, the sending the second source node suggestion table to the request device includes:

sending the second source node suggestion table to the request device by using metadata.

According to a sixth aspect, an embodiment of the present application further provides a node selection method, including:

receiving a second source node suggestion table sent by a resolution server, where the second source node suggestion table is generated by the resolution server according to a first source node suggestion table and reference information of at least one source node; the reference information includes location information, status information, and load information; the first source node suggestion table is generated by the monitoring server according to a selection request message that is sent by the resolution server and a source node selection table; the selection request includes an access network identifier of the request device; the source node selection table includes a transmission rate between the request device and the at least one source node; the first source node suggestion table includes an identifier of the at least one source node; and a quantity of identifiers of source nodes in the second source node suggestion table is less than or equal to a quantity of identifiers of source nodes in the first source node suggestion table; and selecting a source node according to the second source node suggestion table.

According to the sixth aspect, in a first possible implementation manner of the sixth aspect, before the receiving a second source node suggestion table sent by a resolution server, the method further includes:

sending a file request message to the resolution server, where the file request message includes an identifier of a requested file and the access network identifier of the request device.

According to the sixth aspect or the first possible implementation manner of the sixth aspect, in a second possible implementation manner, the receiving a second source node suggestion table sent by a resolution server includes:

receiving the second source node suggestion table that is sent by the resolution server by using metadata.

According to any one of the sixth aspect, or the first or the second possible implementation manner of the sixth aspect, in a third possible implementation manner, the selecting a source node according to the second source node suggestion table includes:

if the second source node suggestion table includes identifiers of at least two source nodes, selecting one source node from the source node suggestion table according to priorities of the at least two source nodes, and requesting the requested file from the source node; or separately requesting, from the at least two source nodes, content fragments of the requested file according to priorities of the at least two source nodes, to obtain the requested file.

According to any one of the sixth aspect, or the first to the third possible implementation manners of the sixth aspect, in a fourth possible implementation manner, the method further includes:

reporting a transmission rate between the request device and the selected source node to the monitoring server, so that the monitoring server updates the source node selection table.

According to the fourth possible implementation manner of the sixth aspect, in a fifth possible implementation manner, the reporting a transmission rate between the request device and the selected source node to the monitoring server and updating the source node selection table includes:

reporting the transmission rate between the request device and the selected source node to the monitoring server according to a preset time or a preset period, so that the monitoring server updates the source node selection table.

According to the monitoring server, the resolution server, the request device, and the node selection method provided in the embodiments of the present application, the monitoring server generates a first source node suggestion table according to a selection request message sent by the resolution server and a source node selection table, and feeds back the first source node suggestion table to the resolution server; the resolution server processes the first source node suggestion table to generate a second source node suggestion table and sends the second source node suggestion table to the request device. Because the first source node suggestion table is generated according to a transmission rate between the request device and at least one source node, so that the request device selects a source node that better meets a transmission bandwidth requirement of a service requested by the request device, so as to meet a transmission requirement of a high-bandwidth service and avoid a "freeze" phenomenon caused by a low transmission rate.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Embodiment 1

Figure 1:
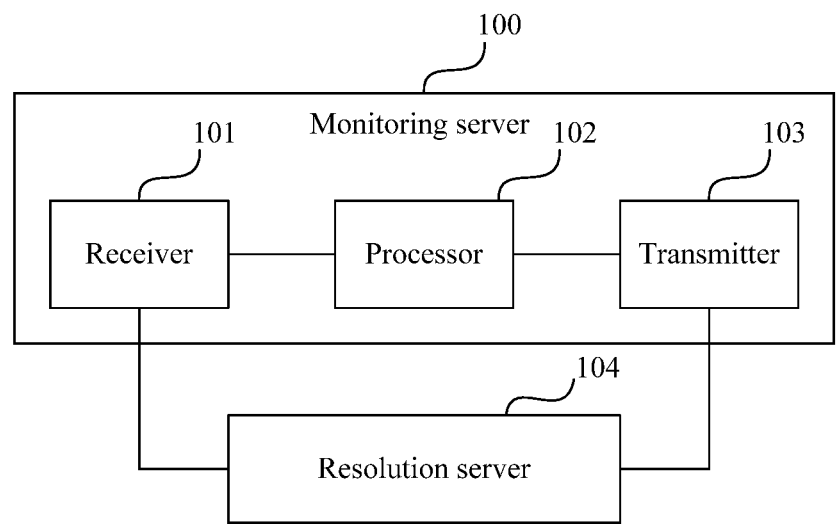
FIG. 1 is a schematic structural diagram of a monitoring server according to Embodiment 1 of the present application.

FIG. 1 is a schematic structural diagram of a monitoring server according to Embodiment 1 of the present application. The monitoring server in this embodiment is located in an ICN network communications system, and may exist as a device independent of a resolution server in the ICN network, or may be configured in the resolution server. The monitoring server may be a network monitoring server (NMS) and is generally implemented in a hardware manner or in a hardware and software combined manner. As shown in FIG. 1, a monitoring server 100 includes a receiver 101, a processor 102, and a transmitter 103. The receiver 101, the processor 102, and the transmitter 103 are sequentially connected. The receiver 101 and the transmitter 103 are connected to a resolution server 104.

The receiver 101 is configured to receive a selection request message sent by the resolution server 104, where the selection request message includes an access network identifier of a request device.

The selection request message may be specifically a source node identifier selection request (Source ID Selection Request) message. The selection request message may be a request message that is sent by the resolution server 104 according to a preset request device and that is used for selecting a data source node for the preset request device, or may be a selection message that is sent according to an order of priorities of multiple preset request devices and that is used for selecting a data source node for a request device.

The access network identifier of the request device may be a node identifier (POP ID) of an access network of the request device. For example, the access network identifier of the request device may be a network access point identifier of user equipment (UE) in a 3rd Generation Partnership Project (3GPP) network, may be an identifier of a packet data network gateway (PGW) of UE in a Wireless Fidelity (WiFi f) network, or may be an identifier of a WiFi access point (AP), an identifier of a digital subscriber line access multiplexer (DSLAM), or the like.

The processor 102 is configured to generate a first source node suggestion table according to the selection request message and a source node selection table, where the source node selection table includes a transmission rate between the request device and at least one source node. The first source node suggestion table includes an identifier of the at least one source node.

The source node selection table may be specifically a source node identifier selection table (Source ID Selection Table), and the source node selection table may be stored in the monitoring server. The transmission rate between the request device and the at least one source node may be a transmission rate of transmitting, before this embodiment is implemented, a service the same as or similar to an IO requested by the request device between the request device and the at least one source node.

That the processor 102 generates a first source node suggestion table according to the selection request message and a source node selection table may be specifically that the processor 102 selects at least one source node from the at least one source node according to the access network identifier of the request device and the transmission rate between the request device and the at least one source node, so as to generate the first source node suggestion table. The first source node suggestion table includes an identifier of the selected at least one source node.

The transmitter 103 is configured to send the first source node suggestion table to the resolution server 104, so that the resolution server 104 generates a second source node suggestion table according to the first source node suggestion table and reference information of the at least one source node and sends the second source node suggestion table to the request device, and the request device selects a source node according to the second source node suggestion table, where the reference information includes location information, status information, and load information, and a quantity of identifiers of source nodes in the second source node suggestion table is less than or equal to a quantity of identifiers of source nodes in the first source node suggestion table.

The first source node suggestion table is a source node suggestion list (Suggested Source list). Because the first source node suggestion table is generated with reference to a transmission rate between the request device and each source node, the resolution server further processes the first source node suggestion table, so as to generate a second source node suggestion table. The second source node suggestion table may be the same as or different from the first source node suggestion table. If the second source node suggestion table is the same as the first source node suggestion table, a quantity of identifiers of source nodes in the second source node suggestion table is the same as a quantity of identifiers of source nodes in the first source node suggestion table; or if the second source node suggestion table is different from the first source node suggestion table, a quantity of identifiers of source nodes in the second source node suggestion table is less than a quantity of identifiers of source nodes in the first source node suggestion table. The second source node suggestion table generated according to the first source node suggestion table is transmitted to the request device by using the resolution server, so that the request device and a source node selected by the request device can better meet a transmission requirement on a high-bandwidth service, thereby avoiding a "freeze" phenomenon caused by a low rate.

The monitoring server provided in the solution of this embodiment may generate a first source node suggestion table according to a selection request message sent by a resolution server and a source node selection table, and feeds back the first source node suggestion table to the resolution server; and the resolution server processes the first source node suggestion table, so as to generate a second source node suggestion table and sends the second source node suggestion table to a request device. Because the source node selection table includes a transmission rate between the request device and at least one source node, the request device selects a source node that better meets a transmission bandwidth requirement of a service requested by the request device, so as to meet a transmission requirement of a high-bandwidth service and avoid a "freeze" phenomenon caused by a low transmission rate.

Embodiment 2

This embodiment further provides a monitoring server. Further, in the solution described above, the access network identifier of the request device may be obtained by the resolution server 104 according to a received file request message sent by the request device.

Preferably, the selection request message further includes a source node identifier table, and the source node identifier table is a source node identifier table that is generated after the resolution server 104 performs querying according to an identifier of a requested file and that has the requested file, where the identifier of the requested file is obtained by the resolution server 104 according to the file request message.

Specifically, the source node identifier table may be a source node identifier list (Sources ID List). The identifier of the requested file may be a service identifier (Information ID) of an IO requested by the request device.

The solution in this embodiment is based on the foregoing solution.

The processor 102 is further configured to query, according to the access network identifier of the request device, the source node selection table for a transmission rate between the access network identifier of the request device and each source node; and configured to generate the first source node suggestion table according to the transmission rate between the access network identifier of the request device and each source node.

Preferably, in the monitoring server described above, the processor 102 is further configured to query, according to the access network identifier of the request device and by means of longest prefix match, the source node selection table for the transmission rate between the access network identifier of the request device and each source node.

In this embodiment, based on the monitoring server in the foregoing embodiment, the receiver 101 is connected to the request device and the selected source node.

The receiver 101 is further configured to receive a transmission rate that is between the request device and the selected source node and that is reported by the request device or the selected source node.

The processor 102 is further configured to update the source node selection table according to the transmission rate between the request device and the selected source node.

Preferably, the receiver 101 is further configured to receive the transmission rate that is between the request device and the selected source node and that is reported by the request device or the selected source node according to a preset time or a preset period.

It should be noted that, the transmission rate between the request device and the selected source node may be sent after the request device and the selected source node complete transmission of the whole requested file, or may be sent after a part of the requested file is transmitted.

According to the monitoring server provided in the solution of this embodiment, the processor generates a source node suggestion table, and a manner for querying a transmission rate between a particular request device and each source node is provided; the receiver further updates a source node selection table in coordination with the processor, which can improve accuracy of the generated source node suggestion table, better ensuring a transmission rate requirement of a service having a high bandwidth requirement.

Embodiment 3

Figure 2:
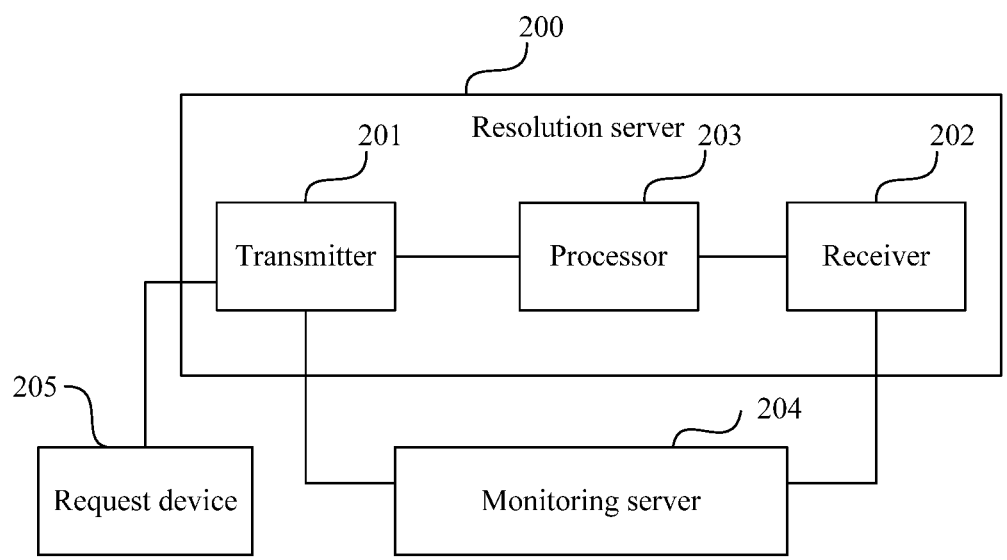
FIG. 2 is a schematic structural diagram of a monitoring server according to Embodiment 3 of the present application.

This embodiment provides a resolution server. FIG. 2 is a schematic structural diagram of a resolution server according to Embodiment 3 of the present application. The resolution server in this embodiment is located in an ICN network communications system. The resolution server may be a name resolution server (NRS) and generally is implemented in a hardware manner or in a hardware and software combined manner. As shown in FIG. 2, a resolution server 200 includes a transmitter 201, a receiver 202, and a processor 203. The transmitter 201 and the receiver 202 are separately connected to a monitoring server 204. The receiver 202 and the processor 203 are connected to the transmitter 201. The transmitter 201 is further connected to a request device 205.

The transmitter 201 is configured to send a selection request message to the monitoring server 204, so that the monitoring server 204 generates a first source node suggestion table according to the selection request message and a source node selection table, where the selection request message includes an access network identifier of the request device, the source node selection table includes a transmission rate between the request device and at least one source node, and the first source node suggestion table includes an identifier of the at least one source node.

The receiver 202 is configured to receive the first source node suggestion table sent by the monitoring server 204.

The processor 203 is configured to generate a second source node suggestion table according to the first source node suggestion table and reference information of the at least one source node, where the reference information includes location information, status information, and load information, and a quantity of identifiers of source nodes in the second source node suggestion table is less than or equal to a quantity of identifiers of source nodes in the first source node suggestion table.

The transmitter 201 is further configured to send the second source node suggestion table to the request device 205, so that the request device 205 selects a source node according to the second source node suggestion table.

The solution provided in this embodiment is a resolution server corresponding to the foregoing monitoring server. A specific implementation process and beneficial effects of the resolution server are similar to those in the foregoing embodiments, and details are not described herein again.

Embodiment 4

This embodiment further provides a resolution server.

In the resolution server 200, the receiver 202 is further connected to the request device 205.

The receiver 202 is further configured to: before the transmitter 201 sends the selection request message to the monitoring server 204, receive a file request message sent by the request device 205, where the file request message includes an identifier of a requested file and the access network identifier of the request device.

Further, based on the foregoing resolution server, the processor 203 is further configured to: before the transmitter sends the selection request message to the monitoring server 204, perform querying according to the identifier of the requested file and generate a source node identifier table having the requested file, where correspondingly, the selection request message further includes the source node identifier table.

Preferably, the transmitter 201 is further configured to send the second source node suggestion table to the request device 205 by using metadata (Metadata).

In the solution of this embodiment, the metadata refers to data for describing the second source node suggestion table, for example, a storage location of the second source node suggestion table. The second source node suggestion table is sent to the request device by using the metadata, implementing that the resolution server easily and efficiently manages a large amount of networked data in the ICN network, for example, source node suggestion tables corresponding to different request devices, so that the request device can efficiently and quickly find the second source node suggestion table.

Based on the foregoing embodiments, the resolution server in the solution of this embodiment can better ensure a transmission requirement of a high-bandwidth service, so that user experience can be improved.

Embodiment 5

Figure 3:
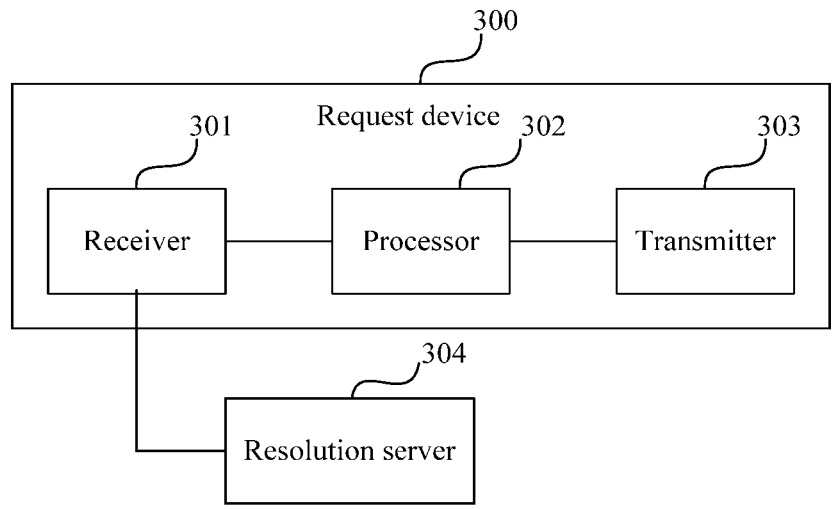
FIG. 3 is a schematic structural diagram of a resolution server according to Embodiment of the present application.

This embodiment provides a request device. FIG. 3 is a schematic structural diagram of a request device according to Embodiment 5 of the present application. As shown in FIG. 3, a request device 300 includes a receiver 301, a processor 302, and a transmitter 303. The receiver 301 is connected to the processor 302, and the receiver 301 is connected to the resolution server 304.

The receiver 301 is configured to receive a second source node suggestion table sent by the resolution server 304, where the second source node suggestion table is generated by the resolution server 304 according to a first source node suggestion table and reference information of at least one source node; the reference information includes location information, status information, and load information; the first source node suggestion table is generated by the monitoring server according to a selection request message that is sent by the resolution server and a source node selection table; the selection request message includes an access network identifier of the request device; the source node selection table includes a transmission rate between the request device and the at least one source node; the first source node suggestion table includes an identifier of the at least one source node; and a quantity of identifiers of source nodes in the second source node suggestion table is less than or equal to a quantity of identifiers of source nodes in the first source node suggestion table.

The processor 302 is configured to select a source node according to the second source node suggestion table.

The solution provided in this embodiment is a request device corresponding to the foregoing monitoring server and the foregoing resolution server. A specific implementation process and beneficial effects of the request device are similar to those in the foregoing embodiments, and details are not described herein again.

Embodiment 6

This embodiment further provides a request device. The transmitter 303 included in the request device 300 in the foregoing embodiment is further connected to the resolution server 304.

The transmitter 303 is configured to send a file request message to the resolution server before the receiver 301 receives the source node suggestion table sent by the resolution server 304, where the file request message includes an identifier of a requested file and the access network identifier of the request device.

Preferably, the receiver 301 is further configured to receive the second source node suggestion table that is sent by the resolution server 304 by using metadata.

Based on the foregoing solution, the processor 302 is further configured to: if the second source node suggestion table includes identifiers of at least two source nodes, select one source node from the source node suggestion table according to priorities of the at least two source nodes, and request the requested file from the source node; or separately request, from the at least two source nodes, content fragments of the requested file according to priorities of the at least two source nodes, to obtain the requested file.

Specifically, if the second source node suggestion table includes only one source node, the request device directly requests the requested file from the request device. The priority may be a value of the transmission rate, and a higher rate indicates a higher priority. If the second source node suggestion table includes identifiers of at least two source nodes, and a bandwidth requirement of the requested file is relatively low, the processor 302 can determine, according to values of priorities, a source node having a highest priority, and request the source node to transmit the requested file. However, for some services having a relatively high bandwidth transmission requirement, multiple source nodes may be selected according to values of priorities, to separately establish connections between the request device and the multiple source nodes, and fragments of the requested file are transmitted, thereby improving a rate of obtaining the requested file.

The request device provided in the solution of this embodiment can further select corresponding source nodes according to different bandwidth requirements of requested files, so as to adapt to services having different transmission bandwidth requirements.

Further, the transmitter 303 is further connected to the monitoring server.

The transmitter 303 is further configured to report a transmission rate between the request device and the selected source node to the monitoring server, so that the monitoring server updates the source node selection table.

Preferably, the transmitter 303 is further configured to report the transmission rate between the request device and the selected source node to the monitoring server according to a preset time or a preset period, so that the monitoring server updates the source node selection table.

Based on the foregoing solution, the solution in this embodiment can be adapted to services having different transmission bandwidth requirements and the source node selection table can be regularly updated, thereby ensuring accuracy of selecting a source node by the request device and better ensuring a transmission rate requirement of a service having a high bandwidth requirement.

Embodiment 7

Figure 4:
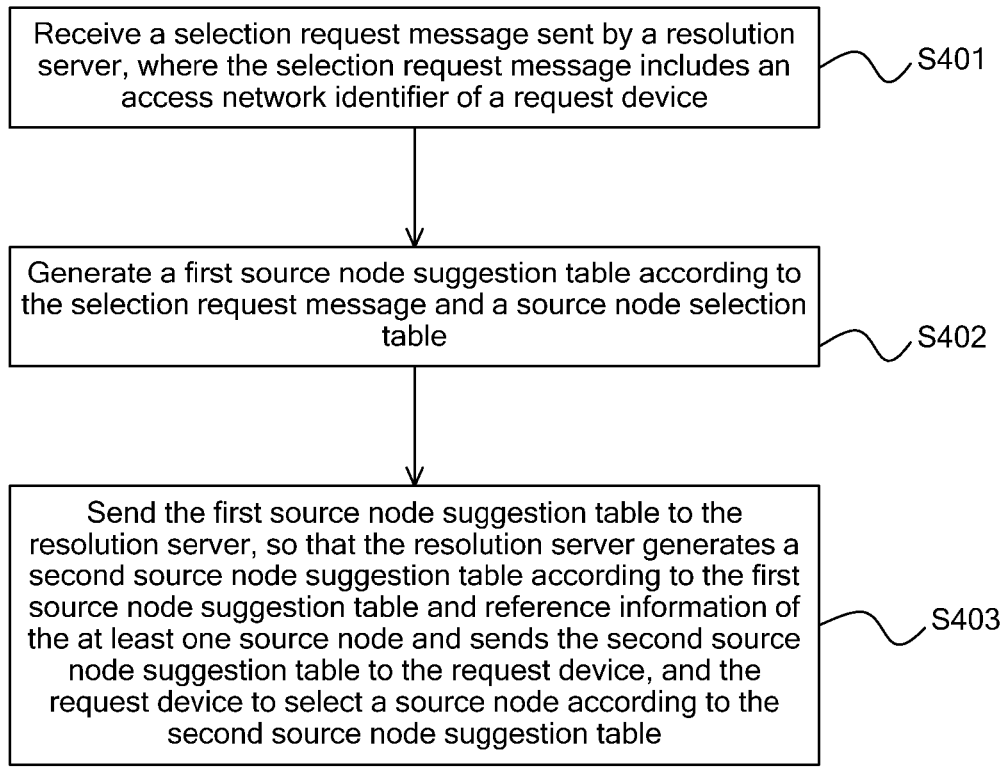
FIG. 4 is a schematic structural diagram of a resolution server according to Embodiment 7 of the present application.

This embodiment further provides a node selection solution. The method may be performed by the monitoring servers provided in the foregoing embodiments. FIG. 4 is a flowchart of a node selection method according to Embodiment 7 of the present application. As shown in FIG. 4, the method specifically includes the following steps:

Step 401: Receive a selection request message sent by a resolution server, where the selection request message includes an access network identifier of a request device.

Step 402: Generate a first source node suggestion table according to the selection request message and a source node selection table.

The source node selection table includes a transmission rate between the request device and at least one source node, and the first source node suggestion table includes an identifier of the at least one source node.

Step 403: Send the first source node suggestion table to the resolution server, so that the resolution server generates a second source node suggestion table according to the first source node suggestion table and reference information of the at least one source node and sends the second source node suggestion table to the request device, and the request device selects a source node according to the second source node suggestion table.

The reference information includes location information, status information, and load information. A quantity of identifiers of source nodes in the second source node suggestion table is less than or equal to a quantity of identifiers of source nodes in the first source node suggestion table.

In the foregoing solution, the access network identifier of the request device is obtained by the resolution server according to a received file request message sent by the request device.

Further, based on the foregoing solution, the selection request message further includes a source node identifier table, and the source node identifier table is a source node identifier table that is generated after the resolution server performs querying according to an identifier of a requested file and that has the requested file, where the identifier of the requested file is obtained by the resolution server according to the file request message.

Further, the foregoing step 402 of generating a first source node suggestion table according to the selection request message and a source node selection table specifically includes:

querying, according to the access network identifier of the request device, the source node selection table for a transmission rate between the access network identifier of the request device and each source node; and generating the first source node suggestion table according to the transmission rate between the access network identifier of the request device and each source node.

As described above, the querying, according to the access network identifier of the request device, the source node selection table for a transmission rate between the access network identifier of the request device and each source node specifically includes:

querying, according to the access network identifier of the request device and by means of longest prefix match, the source node selection table for the transmission rate between the access network identifier of the request device and each source node.

Based on the solution of the embodiment described above, the node selection method further includes:

receiving a transmission rate that is between the request device and the selected source node and that is reported by the request device or the selected source node, and updating the source node selection table.

Preferably, the receiving a transmission rate that is between the request device and the selected source node and that is reported by the request device or the selected source node, and updating the source node selection table specifically includes:

receiving the transmission rate that is between the request device and the selected source node and that is reported by the request device or the selected source node according to a preset time or a preset period, and updating the source node selection table.

The node selection method in this embodiment may be performed by the monitoring server provided in the foregoing embodiment. A specific implementation process and beneficial effects of the node selection method are similar to those in the foregoing embodiments, and details are not described herein again.

Embodiment 8

Figure 5:
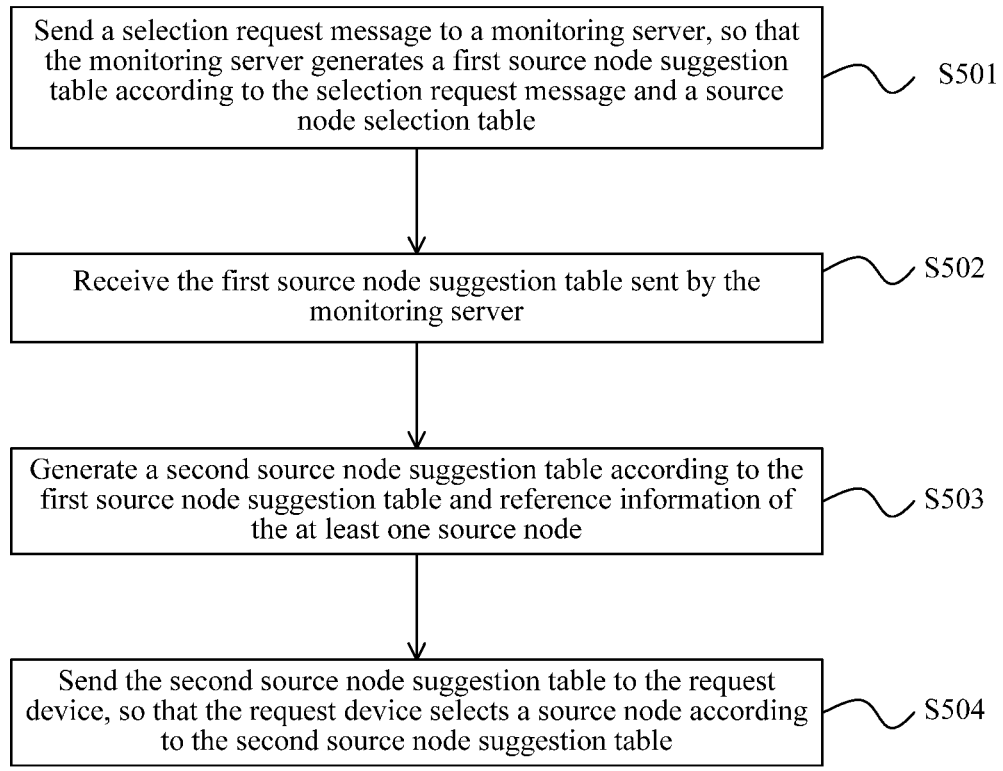
FIG. 5 is a schematic structural diagram of a request device according to Embodiment 8 of the present application.

This embodiment further provides a node selection method. The method may be performed by the resolution server provided in the foregoing embodiment. FIG. 5 is a flowchart of a node selection method according to Embodiment 8 of the present application. As shown in FIG. 5, the method specifically includes the following steps:

Step 501: Send a selection request message to a monitoring server, so that the monitoring server generates a first source node suggestion table according to the selection request message and a source node selection table.

The selection request includes an access network identifier of a request device, the source node selection table includes a transmission rate between the request device and at least one source node, and the first source node suggestion table includes an identifier of the at least one source node.

Step 502: Receive the first source node suggestion table sent by the monitoring server.

Step 503: Generate a second source node suggestion table according to the first source node suggestion table and reference information of the at least one source node.

The reference information includes location information, status information, and load information. A quantity of identifiers of source nodes in the second source node suggestion table is less than or equal to a quantity of identifiers of source nodes in the first source node suggestion table.

Step 504: Send the second source node suggestion table to the request device, so that the request device selects a source node according to the second source node suggestion table.

Further, before step 501 of sending a selection request message to a monitoring server in the foregoing solution, the method further includes:

receiving a file request message sent by the request device, where the file request message includes an identifier of a requested file and the access network identifier of the request device.

Based on the foregoing solution, before step 501 of sending a selection request message to a monitoring server, the method further includes:

performing querying according to the identifier of the requested file and generating a source node identifier table having the requested file, where correspondingly, the selection request message further includes the source node identifier table.

Preferably, step 503 of sending the second source node suggestion table to the request device in the foregoing solution specifically includes:

sending the second source node suggestion table to the request device by using metadata.

The node selection method in this embodiment may be performed by the resolution server provided in the foregoing embodiment. A specific implementation process and beneficial effects of the node selection method are similar to those in the foregoing embodiment, and details are not described herein again.

Embodiment 9

Figure 6:
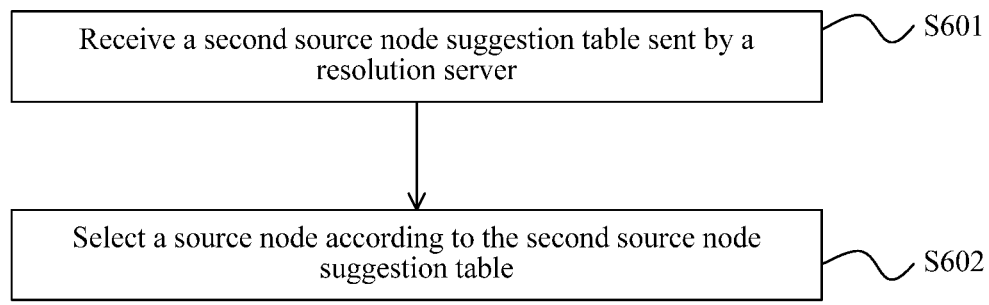
FIG. 6 is a flowchart of a node selection method according to Embodiment 9 of the present application.

This embodiment further provides a node selection method. The method may be performed by the request device provided in the foregoing embodiment. FIG. 6 is a flowchart of a node selection method according to Embodiment 9 of the present application. As shown in FIG. 6, the method specifically includes the following steps:

Step 601: Receive a second source node suggestion table sent by a resolution server.

The second source node suggestion table is generated by the resolution server according to a first source node suggestion table and reference information of at least one source node; the reference information includes location information, status information, and load information; the first source node suggestion table is generated by the monitoring server according to a selection request message that is sent by the resolution server and a source node selection table; the selection request includes an access network identifier of the request device; the source node selection table includes a transmission rate between the request device and the at least one source node; the first source node suggestion table includes an identifier of the at least one source node; and a quantity of identifiers of source nodes in the second source node suggestion table is less than or equal to a quantity of identifiers of source nodes in the first source node suggestion table.

Step 602: Select a source node according to the second source node suggestion table.

Further, before step 601 of receiving a second source node suggestion table sent by a resolution server in the foregoing solution, the method further includes:

sending a file request message to the resolution server, where the file request message includes an identifier of a requested file and the access network identifier of the request device.

Further, step 601 of receiving a second source node suggestion table sent by a resolution server in the foregoing solution specifically includes:

receiving the second source node suggestion table that is sent by the resolution server by using metadata.

Preferably, the foregoing step 602 of selecting a source node according to the second source node suggestion table specifically includes:

if the second source node suggestion table includes identifiers of at least two source nodes, selecting one source node from the source node suggestion table according to priorities of the at least two source nodes, and requesting the requested file from the source node; or separately requesting, from the at least two source nodes, content fragments of the requested file according to priorities of the at least two source nodes, to obtain the requested file.

Further, the foregoing solution further includes:

reporting a transmission rate between the request device and the selected source node to the monitoring server, so that the monitoring server updates the source node selection table.

In the foregoing solution, the reporting a transmission rate between the request device and the selected source node to the monitoring server and updating the source node selection table specifically includes:

reporting the transmission rate between the request device and the selected source node to the monitoring server according to a preset time or a preset period, so that the monitoring server updates the source node selection table.

The node selection method in this embodiment may be performed by the request device provided in the foregoing embodiment. A specific implementation process and beneficial effects of the node selection method are similar to those in the foregoing embodiment, and details are not described herein again.

Embodiment 10

Figure 7:
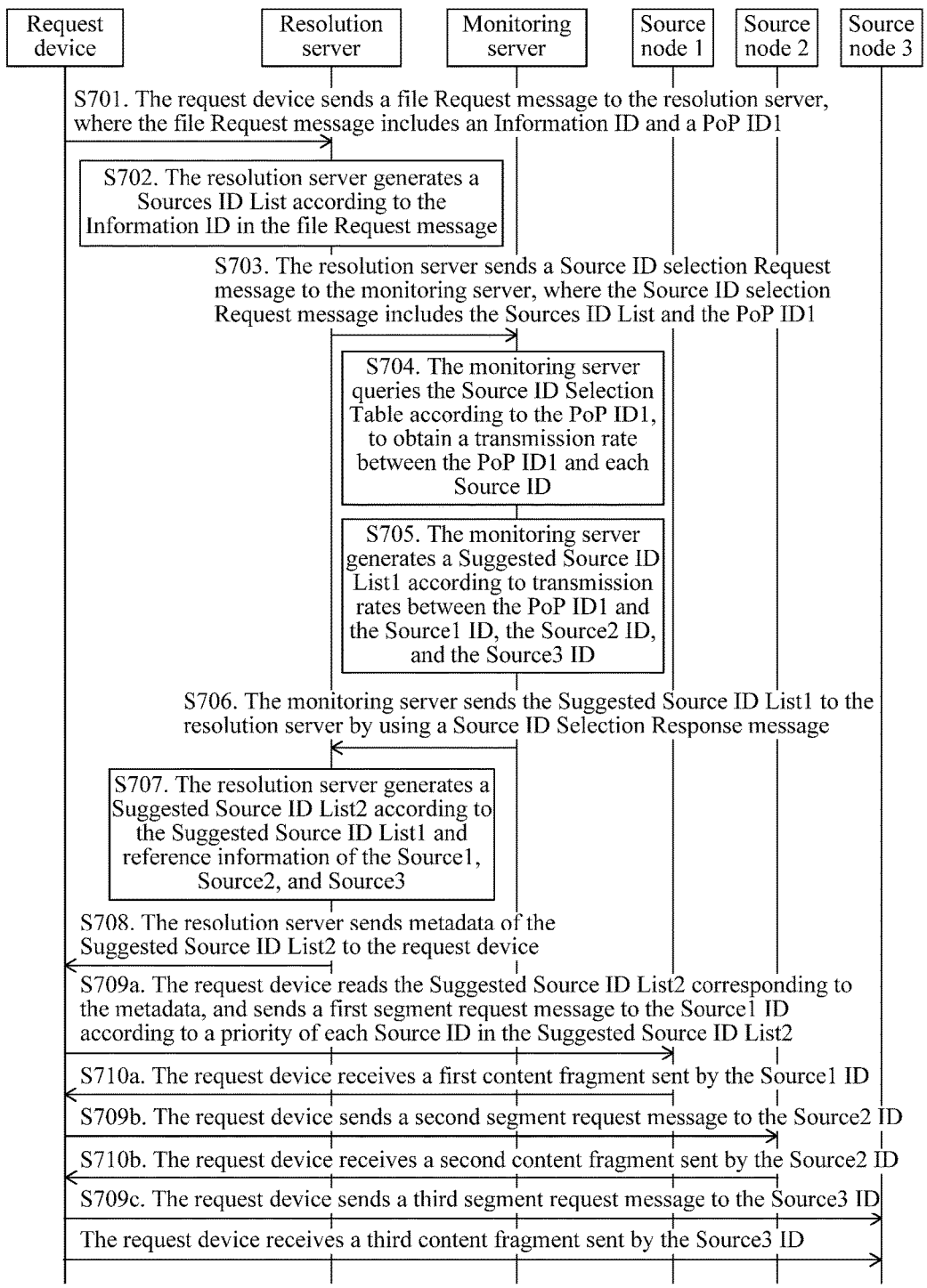
FIG. 7 is a flowchart of a node selection method according to Embodiment 10 of the present application.

This embodiment further provides a node selection method. FIG. 7 is a flowchart of a node selection method according to Embodiment 10 of the present application. This embodiment is illustrated by using a specific example. The method is performed by a resolution server, a monitoring server, a request device, and a source node that is selected by the request device in an interactive manner. As shown in FIG. 7, the method includes:

Step 701: A request device sends a file Request message to a resolution server, where the file Request message includes an Information ID and a PoP ID1.

The Information ID is an identifier of a requested information object, and the PoP ID1 is an access network identifier of the request device.

Step 702: The resolution server generates a Sources ID List according to the Information ID in the file Request message.

Step 703: The resolution server sends a Source ID selection Request message to a monitoring server, where the Source ID selection Request message includes the Sources ID List and the PoP ID1.

Step 704: The monitoring server queries, according to the PoP ID1, the Source ID Selection Table for a transmission rate between the PoP ID1 and each Source ID.

It should be noted that, before step 704 is performed, the monitoring server has created and generated the Source ID Selection Table. The Source ID Selection Table includes at least a PoP ID, all Source IDs, a corresponding transmission rate (Transmission Rate) between the PoP ID1 and each Source ID, and a statistical time (Time) of the transmission rate. The transmission rate may be specifically an average bitrate (Average Bitrate).

It should be noted that, while the Source ID Selection Table is queried according to the PoP ID1 to obtain the transmission rate between the PoP ID1 and each Source ID, a current time also needs to be considered. If there is no time segment corresponding to the current time, a transmission rate between the PoP ID1 and each Source ID within an adjacent time segment is selected.

The Source ID Selection Table may be as shown in Table 1 below.

TABLE 1

| PoP ID | Source ID | Average Bitrate |
| --- | --- | --- |
| PoP ID 1 | Source1 ID | 1000 kbps |
| PoP ID 1 | Source2 ID | 2000 kbps |
| PoP ID 1 | Source3 ID | 1500 kbps |
| PoP ID 2 | Source1 ID | 800 kbps |
| PoP ID 3 | Source2 ID | 2000 kbps |
| PoP ID 4 | Source3 ID | 1500 kbps |

Referring to Table 1, the monitoring server queries the Source ID Selection Table according to the PoP ID1 to obtain transmission rates between the PoP ID1 and a Source1 ID, a Source2 ID, and a Source3 ID.

Step 705: The monitoring server generates a Suggested Source ID List1 according to transmission rates between the PoP ID1 and the Source1 ID, the Source2 ID, and the Source3 ID.

The Suggested Source ID List1 includes the following identifier information: the Source1 ID, the Source2 ID, and the Source3 ID. In descending order of priorities, the Source IDs are sorted as follows: the Source2 ID, the Source3 ID, and the Source1 ID.

Step 706: The monitoring server sends the Suggested Source ID List1 to the resolution server by using a Source ID Selection Response message.

Step 707: The resolution server generates a Suggested Source ID List2 according to the Suggested Source ID List1 and reference information of a Source1, Source2, and Source3.

The reference information may be location information, status information, and load information of the Source1, the Source2, and the Source3. In this embodiment, the Suggested Source ID List1 is the same as the Suggested Source ID List2, that is, both the Suggested Source ID List1 and the Suggested Source ID List2 include the following identifier information: the Source1 ID, the Source2 ID, and the Source3 ID.

Step 708: Send metadata of the Suggested Source ID List2 to the request device.

Step 709a: The request device reads the Suggested Source ID List2 corresponding to the metadata, and sends a first segment request message to the Source1 ID according to a priority of each Source ID in the Suggested Source ID List2.

Step 709b: The request device sends a second segment request message to the Source2 ID.

Step 709c: The request device sends a third segment request message to the Source3 ID.

It should be noted that, there is no definite time sequence relationship among steps 908a to 908c, and steps 908a to 908c may be simultaneously performed, or may be performed sequentially.

Step 710a: The request device receives a first content fragment sent by the Source1 ID.

Step 710b: The request device receives a second content fragment sent by the Source2 ID.

Step 710c: The request device receives a third content fragment sent by the Source3 ID.

The request device may be connected to source nodes respectively corresponding to the Source1 ID, the Source2 ID, and the Source3 ID, so that corresponding content fragments are transmitted. The content fragments corresponding to the three different source nodes may be classified according to priorities of the three source nodes.

It should be noted that, during or after transmission, the Source1 ID, the Source2 ID, the Source3 ID, and the request device may further send transmission rates corresponding to the Source1 ID, the Source2 ID, the Source3 ID, and the request device to the monitoring server, so as to update the Source ID Selection Table.

The solution in this embodiment illustrates the methods in the foregoing embodiments by using a specific example. Beneficial effects of the solution in this embodiment are similar to those in the foregoing embodiments, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A monitoring server, comprising:
a receiver;
a processor; and
a transmitter, wherein the receiver, the processor, and the transmitter are sequentially connected, and the receiver and the transmitter are connected to a resolution server;
the receiver is configured to receive a selection request message sent by the resolution server, wherein the selection request message comprises an access network identifier of a request device;
the processor is configured to generate a first source node suggestion table according to the selection request message and a source node selection table, wherein the source node selection table comprises a transmission rate between the request device and at least one source node, and the first source node suggestion table comprises an identifier of the at least one source node; and
the transmitter is configured to send the first source node suggestion table to the resolution server, so that the resolution server generates a second source node suggestion table according to the first source node suggestion table and reference information of the at least one source node and sends the second source node suggestion table to the request device, and the request device selects a source node according to the second source node suggestion table, wherein the reference information comprises location information, status information, and load information, and a quantity of identifiers of source nodes in the second source node suggestion table is less than or equal to a quantity of identifiers of source nodes in the first source node suggestion table.

2. The monitoring server according to claim 1, wherein the access network identifier of the request device is obtained by the resolution server according to a received file request message sent by the request device.

3. The monitoring server according to claim 2, wherein the selection request message further comprises a source node identifier table, and the source node identifier table is a source node identifier table that is generated after the resolution server performs querying according to an identifier of a requested file and that includes the identifier of the at least one source node which has the requested file, wherein the identifier of the requested file is obtained by the resolution server according to the file request message.

4. The monitoring server according to claim 1, wherein the processor is further configured to query, according to the access network identifier of the request device, the source node selection table for a transmission rate between the access network identifier of the request device and each source node, and generate the first source node suggestion table according to the transmission rate between the access network identifier of the request device and each source node.

5. The monitoring server according to claim 4, wherein the processor is further configured to query, according to the access network identifier of the request device and by means of longest prefix match, the source node selection table for the transmission rate between the access network identifier of the request device and each source node.

6. The monitoring server according to claim 1, wherein the receiver is further connected to the request device and the selected source node;
the receiver is further configured to receive a transmission rate that is between the request device and the selected source node and that is reported by the request device or the selected source node; and the processor is further configured to update the source node selection table according to the transmission rate between the request device and the selected source node.

7. The monitoring server according to claim 6, wherein the receiver is further configured to receive the transmission rate that is between the request device and the selected source node and that is reported by the request device or the selected source node according to a preset time or a preset period.

8. A resolution server, comprising:
a transmitter;
a receiver; and
a processor, wherein the receiver and the processor are connected to the transmitter; the transmitter and the receiver are separately connected to a monitoring server; and the transmitter is further connected to a request device;

the transmitter is configured to send a selection request message to the monitoring server, so that the monitoring server generates a first source node suggestion table according to the selection request message and a source node selection table, wherein the selection request message comprises an access network identifier of the request device, the source node selection table comprises a transmission rate between the request device and at least one source node, and the first source node suggestion table comprises an identifier of the at least one source node;

the receiver is configured to receive the first source node suggestion table sent by the monitoring server;

the processor is configured to generate a second source node suggestion table according to the first source node suggestion table and reference information of the at least one source node, wherein the reference information comprises location information, status information, and load information, and a quantity of identifiers of source nodes in the second source node suggestion table is less than or equal to a quantity of identifiers of source nodes in the first source node suggestion table; and the transmitter is further configured to send the second source node suggestion table to the request device, so that the request device selects a source node according to the second source node suggestion table.

9. The resolution server according to claim 8, wherein the receiver is further connected to the request device; and
the receiver is further configured to: before the transmitter sends the selection request message to the monitoring server, receive a file request message sent by the request device, wherein the file request message comprises an identifier of a requested file and the access network identifier of the request device.

10. The resolution server according to claim 9, wherein the processor is further configured to: before the transmitter sends the selection request message to the monitoring server, perform querying according to the identifier of the requested file and generate a source node identifier table having the requested file, wherein correspondingly, the selection request message further comprises the source node identifier table.

11. The resolution server according to claim 8, wherein the transmitter is further configured to send the second source node suggestion table to the request device by using metadata.

12. A request device, comprising:
a receiver;
a processor; and
a transmitter, wherein the receiver is connected to the processor, and the receiver is further connected to a resolution server;

the receiver is configured to receive a second source node suggestion table sent by the resolution server, wherein the second source node suggestion table is generated by the resolution server according to a first source node suggestion table and reference information of at least one source node; the reference information comprises location information, status information, and load information; the first source node suggestion table is generated by the monitoring server according to a selection request message that is sent by the resolution server and a source node selection table; the selection request message comprises an access network identifier of the request device; the source node selection table comprises a transmission rate between the request device and the at least one source node; the first source node suggestion table comprises an identifier of the at least one source node; and a quantity of identifiers of source nodes in the second source node suggestion table is less than or equal to a quantity of identifiers of source nodes in the first source node suggestion table; and the processor is configured to select a source node according to the second source node suggestion table.

13. The request device according to claim 12, wherein the transmitter is configured to send a file request message to the resolution server before the receiver receives the second source node recommendation table sent by the resolution server, wherein the file request message comprises an identifier of a requested file and the access network identifier of the request device.

14. The request device according to claim 12, wherein the receiver is further configured to receive the second source node suggestion table that is sent by the resolution server by using metadata.

15. The request device according to claim 12, wherein the processor is further configured to: if the second source node suggestion table comprises identifiers of at least two source nodes, select one source node from the source node suggestion table according to priorities of the at least two source nodes, and request the requested file from the source node; or separately request, from the at least two source nodes, content fragments of the requested file according to priorities of the at least two source nodes, to obtain the requested file.

16. The request device according to claim 12, wherein the transmitter is further connected to the monitoring server; and
the transmitter is further configured to report a transmission rate between the request device and the selected source node to the monitoring server, so that the monitoring server updates the source node selection table.

17. The request device according to claim 16, wherein the transmitter is further configured to report the transmission rate between the request device and the selected source node to the monitoring server according to a preset time or a preset period, so that the monitoring server updates the source node selection table.

* * * * *